United States Patent [19]

Jelinek

[11] Patent Number: 4,702,657
[45] Date of Patent: Oct. 27, 1987

[54] SELF CENTERING SEAL

[75] Inventor: Jerry G. Jelinek, La Habra, Calif.

[73] Assignee: Parker Hannifin Corporation, Cleveland, Ohio

[21] Appl. No.: 879,755

[22] Filed: Jun. 27, 1986

[51] Int. Cl.⁴ .............................................. F16B 43/00
[52] U.S. Cl. .................................... 411/369; 411/533; 411/542
[58] Field of Search ............... 411/369, 542, 915, 533, 411/352, 353, 512; 292/307 R, 307 A, 307 B

[56] References Cited

U.S. PATENT DOCUMENTS

| | | | |
|---|---|---|---|
| 2,560,092 | 7/1951 | La Maser | 411/542 X |
| 2,761,347 | 9/1956 | McKee | 411/369 X |
| 2,795,444 | 6/1957 | Wenzell | 411/542 X |
| 2,983,534 | 9/1961 | Heller et al. | 411/542 |
| 3,202,033 | 8/1965 | Weidner | 411/369 X |
| 3,259,404 | 7/1966 | Papenguth | 411/915 X |
| 3,606,357 | 9/1971 | Yonkers | 411/915 X |
| 3,726,178 | 4/1973 | Dimitry | 411/369 X |

FOREIGN PATENT DOCUMENTS

| | | | |
|---|---|---|---|
| 2846003 | 5/1979 | Fed. Rep. of Germany | 411/542 |
| 881680 | 11/1961 | United Kingdom | 411/542 |

Primary Examiner—Lloyd A. Gall
Attorney, Agent, or Firm—Joseph B. Balazs

[57] ABSTRACT

A self-centering seal for threaded fasteners and the like consists of a rigid, load-bearing retainer in the form of a ring having an elastomeric seal molded in place therein at the inner periphery. The seal is of tear drop shape in section having a portion which projects beyond the surfaces of the retainer, adjacent recessed portions and an inner tip portion with a relatively large radius of curvature. The diameter of the tip portion is sized to be an interference fit on the fastener shank so that the seal may be preassembled with the fastener.

6 Claims, 6 Drawing Figures

SELF CENTERING SEAL

BACKGROUND OF THE INVENTION

This invention relates to seals for fasteners and the like, and more particularly, to a seal assembly which is self centering and may be preassembled and retained on the fastener to facilitate assembly procedures.

Sealing fasteners against leakage can pose a serious challenge where excessively large clearance holes are involved, typically where there is greater than 1/32" diametral clearance. An oil drain plug is one example of this situation while a pressurized structural assembly is another. It is necessary to assure in these instances that the sealing member accommodates the tolerance range of both the opening to be sealed and the fastener involved in order to avoid a leak path.

This problem is accentuated if it is necessary to keep the fastener in tight engagement, that is, where there is no torque loss over a period of time. This requirement rules out the use of a plain rubber or composition flat washer which relaxes and takes a set over a period of time.

Still other problems inherent in devices of this type are requirements that the sealing device be preassembled with the fastener to facilitate handling and to ensure against inadvertent omission, and from the functional standpoint, the requirement that the sealing device retain its resilience over its intended service life.

SUMMARY OF THE INVENTION

This invention solves these problems and meets these requirements by providing an elastomeric tear drop shaped sealing bulb molded in place within a metal (or suitable plastic) retainer of annular configuration. The retainer serves as a load bearing structure so that the fastener may be torqued against a rigid member to provide a long term connection. The sealing bulb includes a projecting portion interposed between adjacent recessed portions to provide a controlled deflection or squeeze of the elastomeric material, typically, on the order of 25% which is considered near optimum static sealing practice. The tip of the sealing bulb converges to a smooth, concave edge of relatively large radius, the diameter of the opening at the tip edge being slightly smaller than the diameter of the fastener shank to provide an interference fit. This assures that the seal assembly can be preassembled on the fastener and retained there for assembly in a threaded opening. Further, the seal assembly is self-centering to locate the projecting portion of the sealing bulb at a position to accommodate the variations of size of the opening to be sealed. The tear drop shape is effective to place the projecting portion of the seal at a relatively large spacing from the shank of the fastener as well as providing the centering function. Finally, since deflection of the seal is limited by the rigid retainer, it will retain its resilience and sealing characteristics for a long period of time.

DETAILED DESCRIPTION OF THE INVENTION

Figure 1:
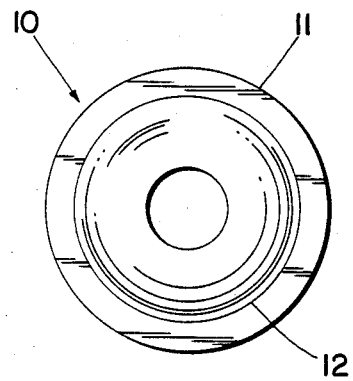
FIG. 1 is a plan view of the seal assembly of the invention.
Figure 2:
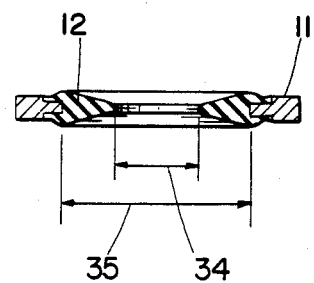
FIG. 2 is a sectional view of the seal assembly of FIG. 1.

Referring now to the drawings, a first embodiment of the seal assembly 10 of the invention is shown in plan and cross sectional views in FIGS. 1 and 2. Seal assembly 10 comprises rigid retainer 11 and elastomeric sealing bulb 12, both being generally circular with sealing bulb 12 secured within retainer 11. As seen more closely in the enlarged partial view of Figure 3, retainer 11 is a ring having substantially flat and parallel upper and lower circular surfaces 14, 15, respectively and outer and inner peripheral cylindrical surfaces 18, 19. A ring-like ledge 20 projects inwardly of inner cylindrical surface 19, being stepped inwardly of upper and lower surfaces 14, 15 to provide one form of interlocking support for sealing bulb 12. Upper and lower surfaces 14, 15 are spaced by a dimension indicated by arrow 21, defining the thickness of retainer 11.

Figure 3:
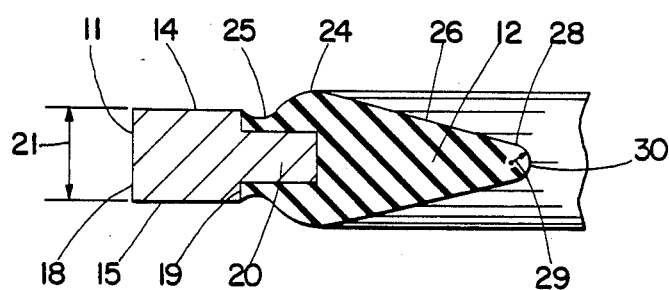
FIG. 3 is an enlarged partial sectional view of the seal assembly of FIG. 1.

Sealing bulb 12 is also best seen in the enlarged partial sectional view of FIG. 3 as comprising an integral ring of elastomeric material secured at ledge 20 and inner peripheral surface 19 of retainer 11 and having projecting portion 24, adjacent outer and inner recessed portions 25, 26, respectively, and tip portion 28 inwardly of inner recessed portion 26. Sealing bulb 12 is preferably symmetrical so that projecting portion 24 and adjacent recessed portions 25, 26 are provided at both surfaces 14, 15 of retainer 11. Sealing bulb 12 is generally of tear drop shape as seen in section of FIG. 3 with projecting portion 24, adjacent recessed portions 25, 26 and tip portion 28 blended into one another to form a continuous, smooth surface. Projecting portion 24 is defined in relation to dimension 21 of retainer 11 and projects axially beyond both upper and lower surfaces 14, 15 thereof. Recessed portions 25, 26 are similarly defined except that both are recessed below upper and lower surfaces 14, 15 of retainer 11. Preferably, outer recessed portion 25 is of concave curvature, blended into convexly curved projecting portion 24, in turn blended into adjacent inner recessed portion 26. Inner recessed portion 26 consists of a pair of conical surfaces which taper linearly inwardly, converging into tip portion 28 which is smoothly rounded into a convex curve of radius depicted by arrow 29 and forming iner tip edge 30. Radius 29 is preferably less than one-half dimension 21 between upper and lower surfaces 14, 15 of retainer 11 and as seen in FIG. 2, forms an inner tip edge 30 diameter indicated by arrow 34, also preferably less than one-half the diameter, as indicated by arrow 35, of projecting portion 24, as measured at its peak. By such dimensioning it will be seen that projecting portion 24 and retainer 11 are positioned a considerable distance from tip portion 28 which arrangement can be utilized to advantageously place projecting portion outside a range of the tolerance of an opening to be sealed.

The configuration of projecting portion 24 of sealing bulb 12 and adjacent recessed portions 25, 26 is a sealing configuration which is geneally well known in the art. In such arrangement, the amount of elastomeric material in projecting portion 24 is arranged to be slightly less than or equal to the void volumes formed by the adjacent recessed portions 25, 26 and adjacent structure to be sealed, so that the voids are substantially filled when sealing bulb 12 is deflected or deformed under pressure. Preferably, such deformation of the cross section of sealing bulb 12 is limited to about 25% to provide an optimum sealing arrangement which will retain its sealing characteristics over a long interval of time. Such deformation of the elastomeric sealing bulb 12 is limited by the rigid retainer structure 11 where the sealing assembly 10 is placed between sealing surfaces.

Figure 4:
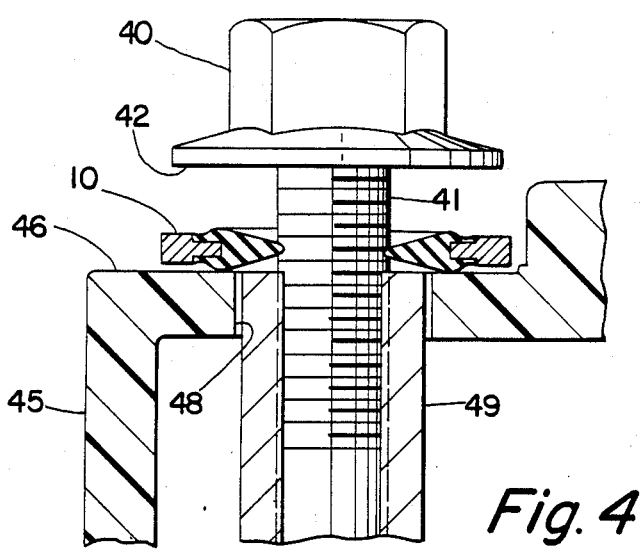
FIG. 4 is a sectional view of the seal assembly of FIG. 1 shown preassembled to a fastener, partially threaded at a joint to be sealed.
Figure 5:
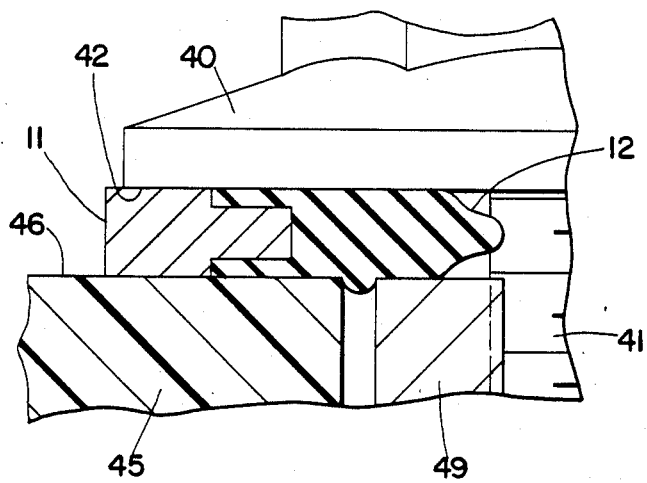
FIG. 5 is an enlarged partial sectional view of the fastener and seal assembly of FIG. 4 after the fastener has been fully threaded to make a sealed joint.

One example of this arrangement is depicted in FIGS. 4 and 5 wherein sealing assembly 10 is shown positioned on a fastener 40 respectively, in preassembled and assembled conditions. Fastener 40 may be a conventional bolt having a threaded shank 41 and a cap with a flat, annular sealing surface 42. The object to be sealed is, for example, housing 45, having flat sealing surface 46 with opening 48 therein. Threaded stud 49 is depicted within housing 45, being rigidly mounted therein and adapted to receive fastener 40 to draw cap sealing surface 42 into close proximity to housing sealing surface 46.

Seal assembly 10 is shown preassembled on fastener 40 in FIG. 4 with upper and lower surfaces 14, 15 interposed between cap sealing surface 42 and housing surface 46. Seal assembly 10 is fully supported on fastener 40 solely by tip portion 28 in engagement with shank 41. The diameter 34 of tip edge 30 is smaller than the diameter of shank 41, providing an interference fit while the radius 29 of tip portion 28 is sufficiently large to avoid substantial penetration of tip portion 28 between the threads of fastener 40 which might affect the positioning of seal assembly 10. As noted, seal assembly is then positioned with projecting portion 24 outwardly of opening 48 in housing 45 and beyond any combination of the range of misalignment of stud 49 with respect to opening 48, the tolerance of opening 48 itself, and the tolerance of the shank 41 of fastener 40.

In the enlarged view of FIG. 5, fastener 40 has been fully threaded into stud 49 so that cap sealing surface 42, retainer 11 and housing sealing surface 46 are in firm contact, limiting further engagement of fastener 40 into stud 49. Fastener 40 may be torqued to any desired level and it will be noted that retainer 11 prevents any further distortion of seal assembly 10 beyond that depicted, resulting in a known, controlled distortion thereof, well within its range of sealing capabilities. Sealing bulb 12 is distorted in FIG. 5 into engagement between cap sealing surface 42 and housing sealing surface 46 as well as the upper portion of stud 49 to provide an enhanced seal. Projecting portions 24 have been deformed into adjacent recessed portions 25, 26 substantially completely filling the voids thereby and creating an expansive sealing area of predeterminable characteristics.

Figure 6:
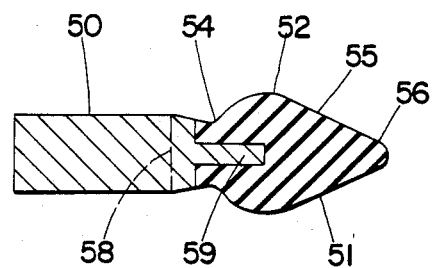
FIG. 6 is an enlarged partial sectional view of a second embodiment of seal assembly of the invention.

Another embodiment of the invention is shown in Figure 6, in this arrangement having a similar circular retainer 50 and sealing bulb 51 of tear drop shape. Sealing bulb 51 includes projecting portion 52 and adjacent outer and inner recessed surfaces 54, 55, being similarly smoothly contoured and culminating in tip portion 56, but in this instance, inner recessed surfaces converge at a sharper angle. This results in the positioning of tip portion 56 closer to projecting portion 52 and modification of the radially extended tear drop shape to a more compact form, however, the same attributes of this embodiment result as described with respect to that shown in FIGS. 1-5. Dashed line 58 indicates that the inner periphery of retainer 11 may be formed as an alternate series of axially extending ribs and grooves to enhance the bond between the sealing bulb 51 and retainer 50 while still retaining a radially projecting ledge 59.

In both embodiments of the invention, the sealing bulb 12, 51 is preferably molded in place to the respective retainer 11, 50, however, these elements may be formed separately and bonded together by adhesives or the like in other manufacturing techniques. Preferably, retainers 11, 50 are metal, however, rigid plastics would serve as well in many instances and the invention is not to be construed as so limited. Sealing bulbs 12, 51 may be natural rubber or any one of many different forms of synthetic elastomers such as nitrile or the like, which are well known as sealing materials for devices of this type.

I claim:

1. A self-centering, elastomeric seal assembly in combination with a fastener or and the like, comprising
  a retainer having generally parallel upper and lower surfaces and a central opening therein, adapted for placement about the shank of the fastener or the like, and
  annular elastomeric seal means disposed in said central opening of said retainer and secured thereto for support of said retainer,
  said seal means being generally tear drop shaped in cross section comprising a projecting seal portion, adjacent inner and outer recessed seal portions, and an inner circular tip portion, said projecting seal portion extending axially outwardly of said retainer beyond said upper and lower surfaces thereof, said inner and outer recessed seal portions being recessed axially from said upper and lower surfaces of said retainer, said tip portion extending radially inwardly of said inner recessed seal portion and terminating in a smoothly rounded edge of convex curvature, the diameter of said tip portion at said edge being less than the diameter of the shank of the fastener or the like to provide an interference fit thereon for support of the entire seal assembly, the radius of curvature of said edge being less than one-half the dimension between said upper and lower surfaces of said retainer, said inner recessed portion comprising a pair of linearly inwardly converging conical surfaces which merge into said tip portion to position said projecting portion relative to the shank of said fastener or the like and outside a range of tolerance of an opening in which said fastener is to be disposed.

2. The combination set forth in claim 1 wherein said retainer is a rigid circular member adapted to load-bearing placement between a surface defining an opening in a device to be sealed and the conforming sealing surface of the fastener or the like.

3. The combination set forth in claim 2 wherein the diameter of said projecting seal portion is greater than the diameter of said opening in a device to be sealed for any range of tolerance in the size of said opening.

4. The combination set forth in claim 1 wherein said retainer further comprises an inner circular ledge in said retainer opening, said ledge extending beneath said outer recessed portion and said projecting portion of said seal means.

5. The combination set forth in any one of claims 1–4 wherein said retainer is metal and said seal means is bonded to said retainer.

6. The combination set forth in any one of claims 1–4 wherein said seal means is molded in place to said retainer.

* * * * *